Patented July 9, 1935

2,007,427

UNITED STATES PATENT OFFICE 2,007,427

COMPOSITION FOR WATERPROOFING MORTAR AND THE LIKE

Bernard Heimann, Datteln, Germany

No Drawing. Application November 5, 1934, Serial No. 751,673. In Germany October 21, 1933

6 Claims. (Cl. 106—27)

My invention relates to a compound for waterproofing mortar, cement, etc. Many compounds have already been proposed for this purpose, i. e., for rendering mortar, cement, etc., resistant against offensive liquids, such as acid and alkaline water, atmospheric and other influences. Their waterproofing action is generally attributed to the presence of fats or salts of fatty acids which, being valuable and present at high percentages, increase the cost of such compounds.

It is an object of my invention to provide a waterproofing compound which is not in any way inferior to the old compounds but is without, or contains only, a small percentage of, the aforesaid valuable salts, and is cheap in proportion.

To this end, in my novel compound, I mix finely comminuted barium sulphate, quick lime, ground crystallized silicon dioxide, aluminium silicate, water glass, colloidal silicic acid, and a fluate, preferably fluate of magnesium.

Mortar or cement, etc., to which this compound is added, becomes practically waterproof even if the percentage of lime is very low. However, the waterproofing efficiency of the compound may be increased by adding, instead of the barium sulphate, a salt of a fatty acid, for instance, aluminum salt of fatty acid. Otherwise, the compound contains the same constituents as the one described above, and the percentage of the salt is so low as not to influence the price of the compound to any appreciable extent.

The composition, by weight, of a satisfactory compound according to my invention, without a salt of a fatty acid, may be as follows:

| | Parts |
|---|---|
| I. Barium sulphate | 5 |
| Quick lime | 5 |
| Ground silicon dioxide | 5 |
| Aluminium silicate | 5 |
| Water glass | 50 |
| Colloidal silicic acid | 130 |
| Fluate | 2 |

If it is desired to increase the efficiency of the compound by a small percentage of a salt of a fatty acid, the composition, by weight, may be as follows:

| | Parts |
|---|---|
| II. Quick lime | 30 |
| Ground silicon dioxide | 30 |
| Aluminium silicate | 30 |
| Water glass | 30 |
| Colloidal silicic acid | 60 |
| Fluate | 2 |
| Salt of fatty acid | 10 |

In compounds I and II, the fluate is preferably fluate of magnesium, and in compound II the salt is preferably aluminum salt of fatty acid.

The content of salt in compound II which replaces the barium sulphate, is only 6%.

It is important that the constituents of the compound should be comminuted very finely, in fact, to the fineness of pollen.

As mentioned, compound "I" renders mortar, cement, etc., practically waterproof, but compound "II" is even more efficient.

I have found that, while it is important that the compounds should contain the individual constituents recited, and be reduced to an extremely fine powder, it is equally important that the constituents should be properly proportioned.

It has already been proposed to add colloidal silicic acid and fluates to mortar but these substances are used in combinations which are quite different from those according to my invention, and their action is therefore also different.

I claim:

1. A compound for waterproofing mortar, containing barium sulphate, quick lime, ground silicon dioxide, aluminium silicate, water glass, colloidal silicic acid, and a fluate, all reduced to a very fine powder.

2. A compound for waterproofing mortar, containing barium sulphate, quick lime, ground silicon dioxide, aluminium silicate, water glass, colloidal silicic acid, and fluate of magnesium, all reduced to a very fine powder.

3. A compound for waterproofing mortar, containing 5 parts by weight each of: barium sulphate, quick lime, ground silicon dioxide, and aluminium silicate; 50 parts by weight of water glass, 130 parts by weight of colloidal silicic acid, and 2 parts by weight of fluate, all reduced to a very fine powder.

4. A compound for waterproofing mortar, containing quick lime, ground silicon dioxide, aluminium silicate, water glass, colloidal silicic acid, fluate, and a salt of a fatty acid, all reduced to a very fine powder.

5. A compound for waterproofing mortar, containing quick lime, ground silicon dioxide, aluminium silicate, water glass, colloidal silicic acid, fluate, and aluminum salt of fatty acid, all reduced to a very fine powder.

6. A compound for waterproofing mortar, containing 30 parts per weight each of: quick lime, ground silicon dioxide, aluminium silicate and water glass; 60 parts by weight of colloidal silicic acid, 2 parts by weight of fluate, and 10 parts by weight of an aluminum salt of a fatty acid, all reduced to a very fine powder.

BERNARD HEIMANN.